(12) United States Patent
Takeyama et al.

(10) Patent No.: US 6,786,211 B2
(45) Date of Patent: Sep. 7, 2004

(54) INTAKE DEVICE FOR INTERNAL COMBUSTION ENGINE

(75) Inventors: Masaki Takeyama, Okazaki (JP); Naoya Kato, Ama-gun (JP); Takashi Nishimoto, Toyota (JP); Kouichi Oda, Kariya (JP)

(73) Assignees: Nippon Soken, Inc., Nishio (JP); Toyoda Boshoku Corporation, Kariya (JP)

( * ) Notice: Subject to any disclaimer, the term of this patent is extended or adjusted under 35 U.S.C. 154(b) by 0 days.

(21) Appl. No.: 10/456,512

(22) Filed: Jun. 9, 2003

(65) Prior Publication Data

US 2004/0031470 A1 Feb. 19, 2004

(30) Foreign Application Priority Data

Jun. 7, 2002 (JP) ........................................ 2002-166917

(51) Int. Cl.$^7$ ................................................ F02M 33/00
(52) U.S. Cl. .................................. 123/572; 123/184.57
(58) Field of Search ................................ 123/572–574, 123/184.21–18

(56) References Cited

U.S. PATENT DOCUMENTS 5,495,834 A * 3/1996 Rutschmann et al. .. 123/184.31
5,628,287 A * 5/1997 Brackett et al. ....... 123/184.55
5,647,314 A * 7/1997 Matsumura et al. ... 123/184.57
5,806,480 A * 9/1998 Maeda et al. .......... 123/184.57

FOREIGN PATENT DOCUMENTS

JP            A 2002-4956        1/2002

* cited by examiner

Primary Examiner—Marguerite McMahon
(74) Attorney, Agent, or Firm—Oliff & Berridge, PLC

(57) ABSTRACT

An intake device for an internal combustion engine has: a first intake pipe which is connected to the engine so as to conduct an intake air to the engine, and which has an opening portion that is provided in an upstream-side lower portion of the first intake pipe located at an upstream side in a flowing direction of the intake air; and a second intake pipe which has a downstream-side end portion that faces an upstream-side end portion of the first intake pipe, with a gap formed therebetween, and which conducts the intake air to the first intake pipe. An unburned gas reflux passage is provided for conducting an unburned gas from the engine to the first intake pipe. A container surrounds the gap and the opening so as to receive the unburned gas flowing from the opening portion. Thus, it becomes possible to prevent release of unburned gas into the atmosphere by performing a simple process on a conventional structure.

9 Claims, 5 Drawing Sheets

INTAKE DEVICE FOR INTERNAL COMBUSTION ENGINE

INCORPORATION BY REFERENCE

The disclosure of Japanese Patent Applications No. 2002-166917 filed on Jun. 7, 2002, including the specification, drawings and abstract, is incorporated herein by reference in its entirety.

BACKGROUND OF THE INVENTION

1. Field of the Invention

The invention relates to an intake device for an internal combustion engine of a motor vehicle or the like.

2. Description of the Related Art

An example of the internal combustion engine-purposed intake devices that prevent release of unburned gasses, such as fuel vapor and the like, is an intake device as shown in FIG. 6 in which an adsorbent layer 101 is formed around an outer peripheral surface of an intake passageway 100 (Japanese Patent Application Laid-open No. 2002-4956). In this intake device for an internal combustion engine, unburned gas flowing in the intake passageway 100 is adsorbed and trapped by the adsorbent layer 101. Therefore, in the internal combustion engine-purposed intake device, it is essential that the adsorbent layer 101 be formed on an outer peripheral surface of the intake passageway 100. However, due to the provision of the adsorbent layer 101, the number of component parts of the intake device increases and the production process of the device becomes rather complicated, in comparison with a conventional internal combustion engine-purposed intake device.

SUMMARY OF THE INVENTION

Accordingly, it is an object of the invention to provide an internal combustion engine-purposed intake device that is made capable of preventing release of unburned gas into the atmosphere by performing a simple process on a conventional structure.

In accordance with the invention, an intake device for an internal combustion engine includes: a first intake pipe which is connected to the internal combustion engine so as to conduct an intake air to the internal combustion engine, and which has an opening portion that is provided in an upstream-side lower portion of the first intake pipe located at an upstream side in a flowing direction of the intake air; and a second intake pipe which has a downstream-side end portion that faces an upstream-side end portion of the first intake pipe, with a gap formed between the downstream-side end portion of the second intake pipe and the upstream-side end portion of the first intake pipe, and which conducts the intake air to the first intake pipe. An unburned gas reflux passage is provided which conducts an unburned gas from the internal combustion engine to the first intake pipe. The intake device further includes a container that surrounds the gap and the opening, and that receives the unburned gas flowing from the opening portion.

According to the above-described internal combustion engine-purposed intake device, intake air is conducted to the internal combustion engine via the second intake pipe and then the first intake pipe. The unburned gas from the engine is conducted to the first intake pipe via the unburned gas reflux passage. Since the unburned gas has a greater specific gravity than air, the unburned gas, during a stop of the engine, moves along a lower portion of the first intake pipe, and then falls into the container via the opening portion, and thus resides in the container. In the invention, the unburned gas refers to a gas that has not been completely burned, and includes an incompletely burned gas as well as a gas that has not been burned at all. The unburned gas also includes a fuel vapor that flows back through the first intake pipe due to diffusion from the internal combustion engine during a stop of the engine, as well as a gas conducted to the first intake pipe via the unburned gas reflux passage as described above.

Due to the provision of the opening portion in the upstream-side lower portion of the first intake pipe and the formation of the container surrounding the gap and the opening portion, unburned gas can be stored in the container. Therefore, it becomes possible to prevent release of unburned gas into the atmosphere. The opening portion is provided in a lower portion of an upstream-side portion of the first intake pipe. The "lower portion" herein includes a lowermost end portion of an intake pipe whose axis extends substantially horizontally, and also includes a portion of a lower half portion of an intake pipe that is other than a lowermost end portion. During an operation of the internal combustion engine, unburned gas is refluxed to the first intake pipe and is then conducted to the engine by a suction stream of atmospheric air. Furthermore, suction noises enter the container via the gap between the first intake pipe and the second intake pipe. Therefore, the function of the container as a resonant chamber is maintained. If the first intake pipe and the second intake pipe that face each other are joined at a portion, the above-stated operation and advantages can be achieved as long as a gap is formed between the two pipes.

BRIEF DESCRIPTION OF THE DRAWINGS

The above mentioned and other objects, features, advantages, technical and industrial significance of this invention will be better understood by reading the following detailed description of preferred embodiments of the invention, when considered in connection with the accompanying drawings, in which.

DESCRIPTION OF THE EXEMPLARY EMBODIMENTS

In the following description and the accompanying drawings, the present invention will be described in more detail with reference to exemplary embodiments.

Figure 1:
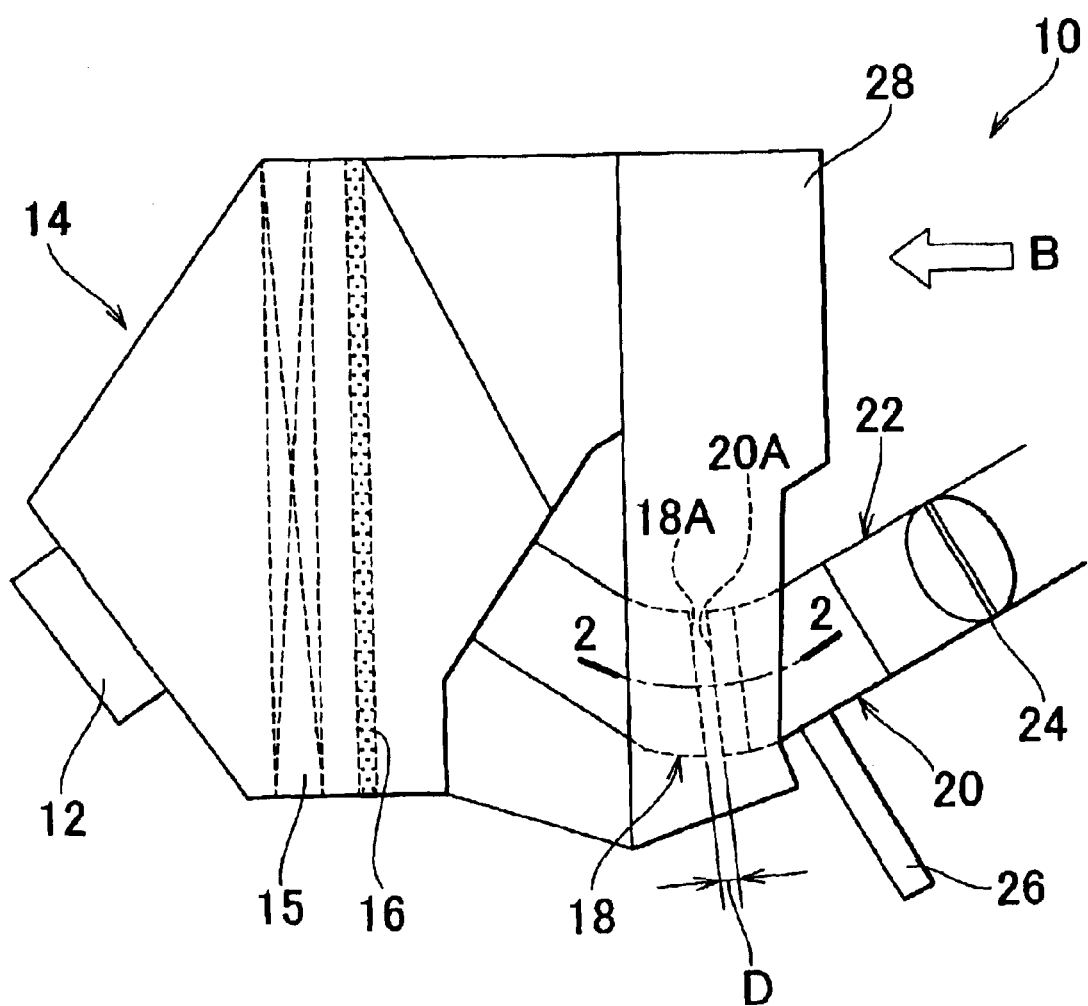
FIG. 1 is a plan view of an internal combustion engine-purposed intake device in accordance with an embodiment of the invention.

As shown in FIG. 1, an internal combustion engine-purposed intake device 10 has an atmospheric air inlet 12. Via the atmospheric air inlet 12, air needed for an engine as an internal combustion engine (not shown) is taken in. An air cleaner case 14 is disposed downstream of the atmospheric air inlet 12 in a flowing direction of intake air. The case 14 contains an air filter 15 and an HC adsorption sheet 16. The HC adsorption sheet 16 is a filter formed by a sheet of activated carbon. The sheet 16 adsorbs hydrocarbon (HC) in the intake device 10.

A second intake pipe 18 is disposed downstream of the air cleaner case 14 in the flowing direction of intake air. The second intake pipe 18 is disposed substantially horizontally so that an axis of the pipe 18 is slightly inclined upward toward a downstream side. An interior of the second intake pipe 18 forms a passageway of intake air that is drawn in via the atmospheric air inlet 12. A first intake pipe 20 is disposed downstream of the second intake pipe 18. The first intake pipe 20 is disposed substantially horizontally so that an axis of the pipe 20 is slightly inclined upward toward the downstream side. An upstream-side end portion 20A of the first intake pipe 20 faces a downstream-side end portion 18A of the second intake pipe 18, with a gap D formed therebetween. A construction is made such that the intake air drawn into the second intake pipe 18 is conducted to the first intake pipe 20.

Figure 3:
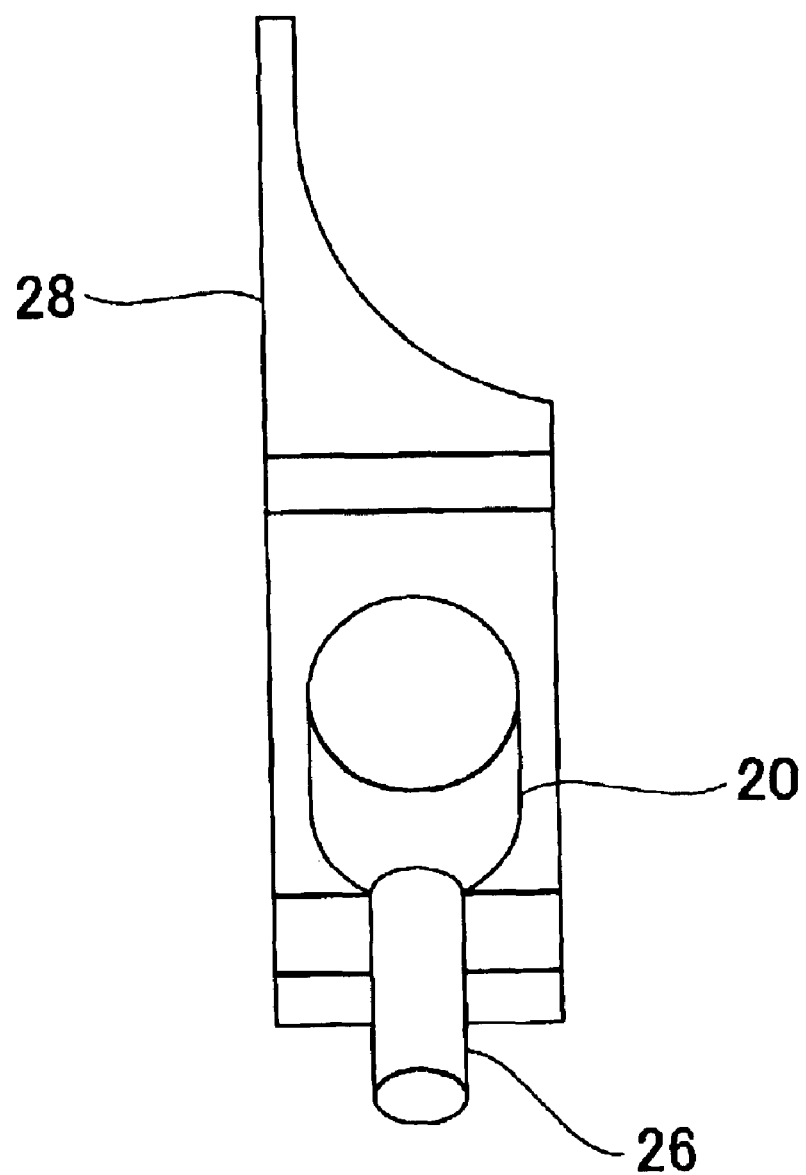
FIG. 3 is a side view taken in a direction indicated by an arrow B in FIG. 1.

A downstream side portion of the first intake pipe 20 is connected to the engine (not shown) via a throttle body 22 that contains a throttle valve 24. A PCV (positive crankcase ventilation) passageway 26, provided as an unburned gas reflux passageway, is connected to the first intake pipe 20. Another end of the PCV passageway 26 is connected in communication to a crankcase of the engine (not shown) via a PCV valve (not shown). A construction is made such that unburned gas is conducted to the first intake pipe 20 via the PCV passageway 26. Due to the reflux of unburned gas into the first intake pipe 20, the unburned gas will be subjected to combustion again. It is to be noted herein that a side view taken in a direction indicated by an arrow B in FIG. 1 is shown in FIG. 3.

Figure 2A:
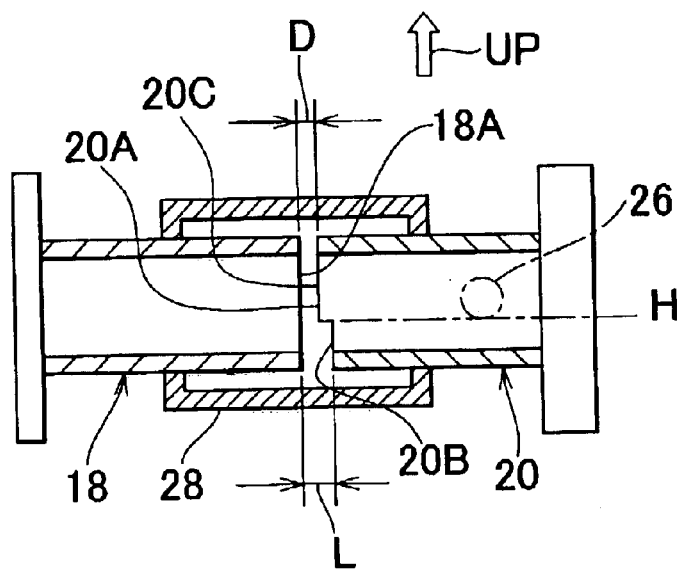
FIG. 2a is a sectional view taken on line 2—2 in FIG. 1.
Figure 2B:
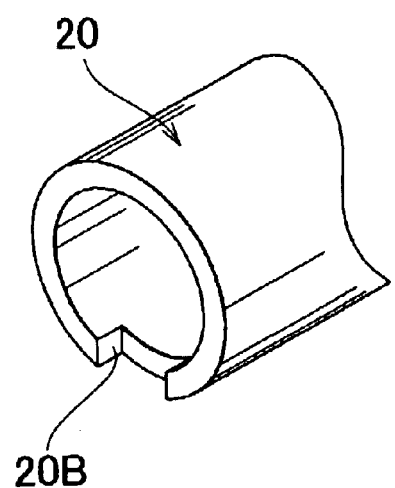
FIG. 2b is a perspective view of a first intake pipe.

FIG. 2a is a sectional view taken along a line 2—2 in FIG. 1. In FIG. 2a, an arrow UP indicates a direction opposite to the direction of gravity. FIG. 2b is a perspective view of the first intake pipe 20. As shown in FIGS. 2a and 2b, a lower end portion of an upstream-side portion of the first intake pipe 20 has a cutout 20B as an opening portion. As shown in FIG. 2a, the cutout 20B is formed at a position such that at least a portion of the cutout 20B is lower than the position H of a lower end of a connecting portion between the first intake pipe 20 and the PCV passageway 26. An interval L between the cutout portion 20B and the downstream-side end portion 18A of the second intake pipe 18 is larger than the size of the gap D between an upper portion 20C of the upstream-side end portion 20A of the first intake pipe 20 and the downstream-side end portion 18A of the second intake pipe 18. If the interval L is slightly less than a diameter of the first intake pipe 20 which is 60 mm, and is greater than or equal to 8 mm and less than or equal to 40 mm, the cutout 20B will also achieve a sound absorption effect as described below. A sealed container 28 is formed surrounding the gap D and the cutout 20B. The container 28 is capable of receiving unburned gas that falls out of the cutout 20B. The container 28 is also designed so as to absorb suction noises that may enter the container 28 via the gap D.

Operation of the embodiment will next be described.

As shown in FIG. 1, the intake air drawn in via the atmospheric air inlet 12 is conducted to the engine (not shown) via the air cleaner case 14, the second intake pipe 18 and the first intake pipe 20. The unburned gas from the engine is conducted to the first intake pipe 20 via the PCV passageway 26. If the throttle valve 24 is open during a stop of the engine (not shown), unburned gas, such as HC, diffusing from the engine, moves along a lower portion of the first intake pipe 20 in a direction toward the HC adsorption sheet 16. If the throttle valve 24 is closed during a stop of the engine, the condensation of unburned gas, such as HC and the like, produced in the PCV passageway 26, vaporizes due to high temperature caused by DBL (diurnal breathing loss) and the like, and the vaporized unburned gas moves along the lower portion of the first intake pipe 20 in the direction toward the HC adsorption sheet 16. Since the unburned gas has a greater specific gravity than air, the unburned gas, during a stop of the engine, moves along a lower portion of the first intake pipe 20, and then falls into the container 28 via the cutout 20B, and resides in the container 28 as can be understood from FIG. 2a.

During an operation of the engine, unburned gas is refluxed into the first intake pipe 20 due to a stream of atmospheric intake air, and is conducted to the engine (not shown). Thus, due to the formation of the cutout 20B in the upstream-side lower end portion of the first intake pipe 20 and the provision of the sealed container 28 surrounding the gap D and the cutout 20B, unburned gas can be stored in the container 28. Therefore, it becomes possible to prevent release of unburned gas into the atmosphere.

It is to be noted that since the opening portion is provided as the cutout 20B formed in a lower end portion of the first intake pipe 20 located at an upstream side of the pipe in the flowing direction of intake air, the formation of the opening portion is easy. Furthermore, since suction noises easily enter the container 28 via the gap D between the first intake pipe 20 and the second intake pipe 18, the container 28 can also function as a resonant chamber. Still further, since at least a portion of the cutout 20B is formed at a position below the connecting portion between the first intake pipe 20 and the PCV passageway 26, unburned gas more easily flows into the cutout 20B.

Figure 4:
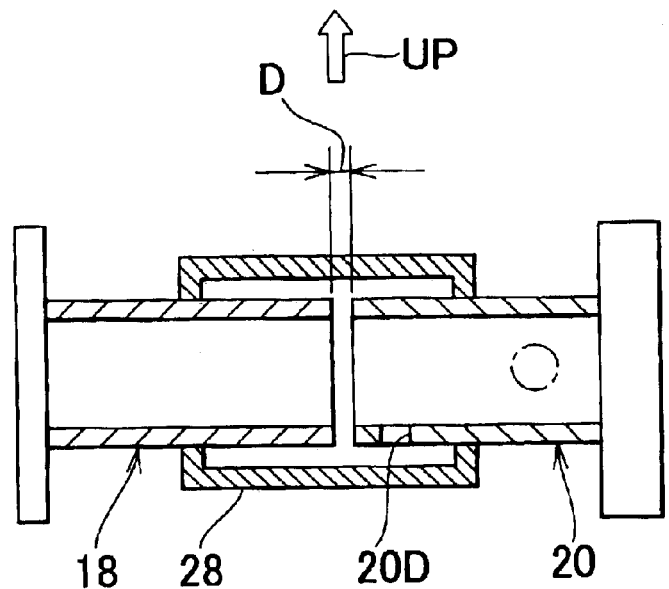
FIG. 4 is a sectional view of an embodiment in which an opening portion is provided apart from a gap.
Figure 5:
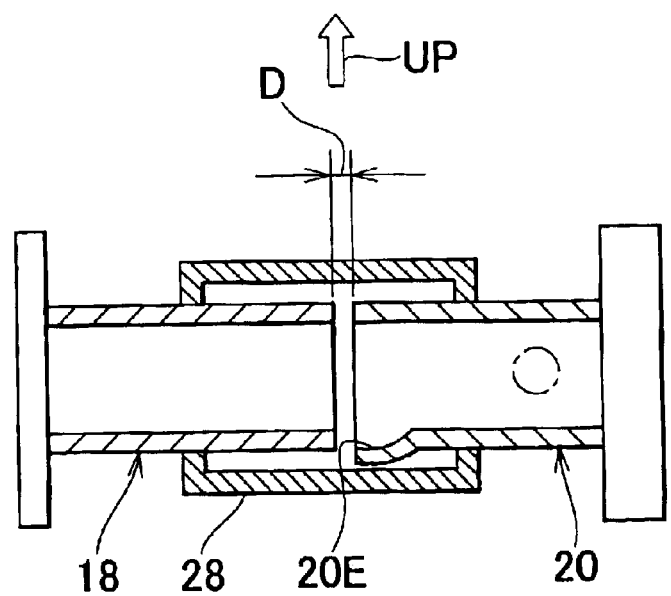
FIG. 5 is a sectional view of an embodiment in which an opening portion is formed by lowering an upstream-side lower end portion of the first intake pipe.
Figure 6:
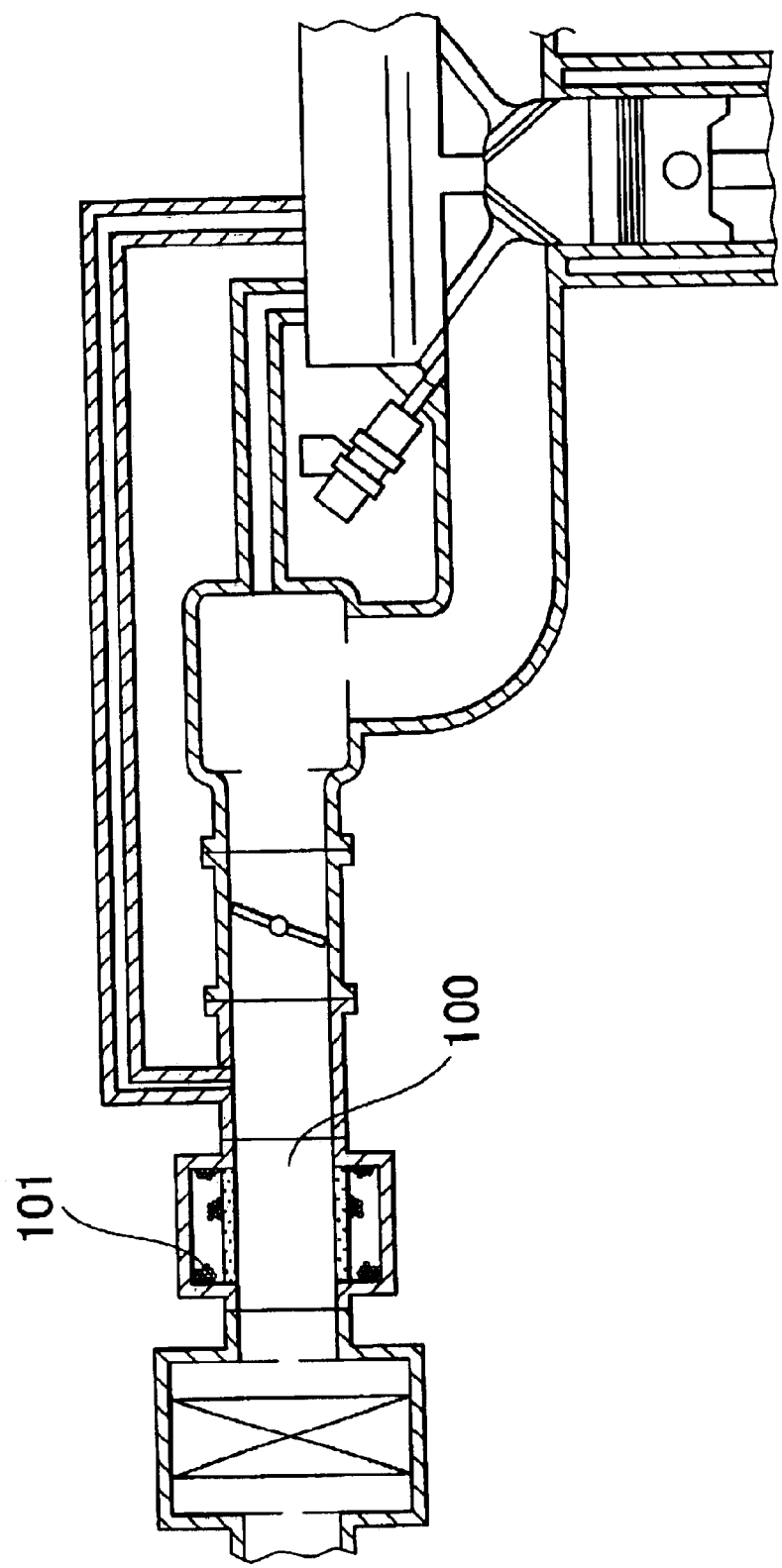
FIG. 6 is a diagram illustrating a conventional internal combustion engine-purposed intake device having a structure for preventing release of unburned gas.

Although in the foregoing embodiment, only one opening portion is provided, the invention is not limited so. For example, it is possible to provide two or more opening portions. According to another embodiment, a construction as shown in FIG. 4 is possible in which an aperture portion 20D is formed as an opening portion apart from the gap D. Furthermore, as shown in FIG. 5, an opening portion 20E may be formed by lowering an upstream-side lower end portion of the first intake pipe 20 relative to the position of a downstream-side lower end portion of the second intake pipe 18 which faces the upstream-side lower end portion of the first intake pipe 20.

Although in the first embodiment, the cutout 20B has a rectangular shape in a sectional view, the invention is not limited so. That is, it is possible to provide a cutout portion having a shape other than the rectangular shape, for example, an elliptical shape or the like. In such a case, it is appropriate that, with regard to at least a portion of the cutout portion, the interval L be greater than the size of the gap D.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An intake device for an internal combustion engine, comprising:
    a first intake pipe which is connected to the internal combustion engine so as to conduct an intake air to the internal combustion engine, and which has an opening portion that is provided in an upstream-side lower portion of the first intake pipe located at an upstream side in a flowing direction of the intake air;
    a second intake pipe which has a downstream-side end portion that faces an upstream-side end portion of the first intake pipe, with a gap formed between the downstream-side end portion of the second intake pipe and the upstream-side end portion of the first intake pipe, and which conducts the intake air to the first intake pipe;
    an unburned gas reflux passage that conducts an unburned gas from the internal combustion engine to the first intake pipe; and
    a container that surrounds the gap and the opening, and that receives the unburned gas flowing from the opening portion.

2. The intake device according to claim 1, wherein the opening portion is provided in an upstream-side lower end portion of the first intake pipe located at the upstream side in the flowing direction of the intake air, and a distance between the downstream-side end portion of the second intake pipe and the opening portion is greater than a size of the gap.

3. The intake device according to claim 2, wherein at least a portion of the opening portion is provided at a position below a connecting portion between the first intake pipe and the unburned gas reflux passage.

4. The intake device according to claim 1, wherein at least a portion of the opening portion is provided at a position below a connecting portion between the first intake pipe and the unburned gas reflux passage.

5. The intake device according to claim 1, wherein the container surrounds and seals a vicinity of the end portion of the first intake pipe and a vicinity of the end portion of the second intake pipe.

6. The intake device according to claim 1, wherein the opening portion is formed by cutting out a portion in the end portion of the first intake pipe.

7. The intake device according to claim 1, wherein the opening portion is formed by cutting out a plurality of portions in the end portion of the first intake pipe.

8. The intake device according to claim 1, wherein the opening portion is provided apart from the end portion of the first intake pipe.

9. The intake device according to claim 1, wherein the opening portion is formed by lowering a portion of the upstream-side lower end portion of the first intake pipe relative to the position of a downstream-side lower end portion of the second intake pipe which faces the upstream-side lower end portion of the first intake pipe.

* * * * *